Feb. 6, 1934.        F. STEBLER        1,945,922
METHOD OF AND MEANS FOR WASHING FRUIT
Filed July 5, 1927
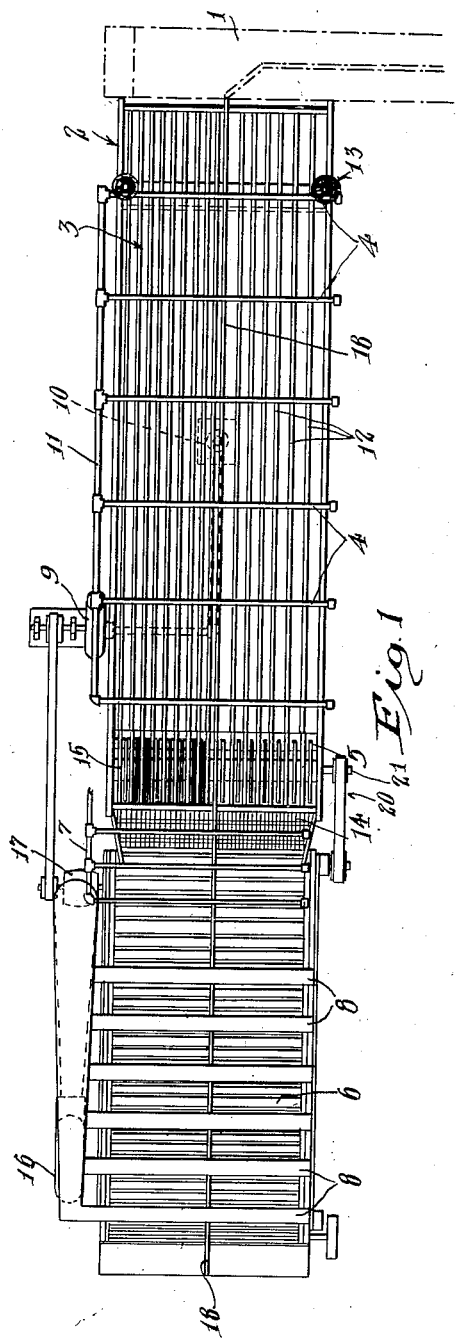
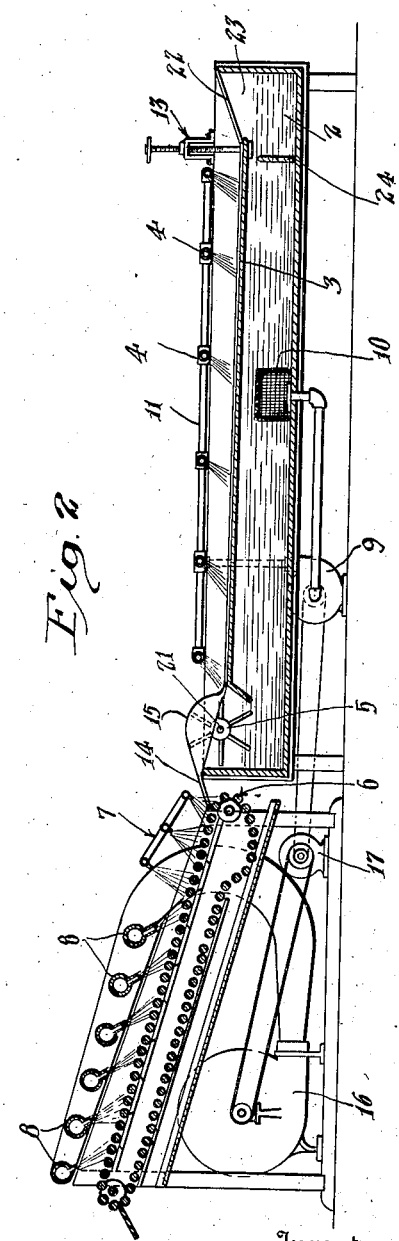
Inventor
Fred Stebler
By Lyon & Lyon
Attorneys Patented Feb. 6, 1934

1,945,922

UNITED STATES PATENT OFFICE 1,945,922

METHOD OF AND MEANS FOR WASHING FRUIT

Fred Stebler, Riverside, Calif., assignor, by mesne assignments, to Food Machinery Corporation, San Jose, Calif., a corporation of Delaware Application July 5, 1927. Serial No. 203,370

33 Claims. (Cl. 146—194)

This invention relates to a method of and means for washing fruit and is more particularly directly related to a method and means for washing fruits with chemical solutions, particularly for the removal from such fruit of spray residues, such as arsenate of lead and the like. The method and means embodying my present invention are also particularly directed to the washing of fruit, the skin of which (such for example as pears) is of such a nature as to make brush cleaning impractical. Fruit, such for example as apples, pears, and the like, it has been found, cannot practically be cleaned by the action of brushes or as easily as by the use of a chemical, such as an acid, alone, for the reason that the latter seems to have an affinity for the residue of the arsenate of lead sprays. A process of cleaning this class of fruit by submerging the same in such an acid solution is very slow where the fruit is immobile in the solution. I have found that subjecting the fruit to a current of such a chemical solution, however, greatly increases the action of the chemical upon the spray residue and that this action is further accelerated by the spraying or jetting of the chemical solution against the fruit, the effectiveness of the treatment apparently depending upon the force with which the jet or spray of the solution strikes the fruit.

Fruit of this character, particularly pears, have a greater specific gravity than the solution within which they are treated, so that the same tend to sink in any solution tank, becoming immobile. I have found that in order to properly clean the fruit by means of such chemical sprays or solutions if a table is submerged in the solution, over which the fruit is propelled in such a manner as to maintain the fruit in a single layer on the table, that this control enables me to efficiently and rapidly cleanse the fruit from the spray residues by maintaining the same under the direct action of the spray of the chemical solution.

It is, therefore, an object of this invention to provide a method of cleaning fruit of chemical residues of chemical sprays, including the steps of partially submerging the fruit in a chemical solution having affinity for the residue of the chemical spray, propelling the fruit through the solution so as to maintain the same in position to be contacted by the current of the moving chemical solution and then removing the fruit from the solution and rinsing and drying the same.

It is also an object of the invention to provide a method of washing fruit in which the fruit is deposited and advanced in a washing liquid and maintained in a single horizontal layer as it is advanced in the liquid while additional washing liquid is discharged downwardly against the fruit to agitate the same.

Another object of this invention is to provide a method of washing the fruit of specific gravity greater than the washing solution employed, which includes propelling the fruit over a table submerged in the solution, spraying the solution over the fruit, and removing the fruit from the solution and rinsing and drying the same.

Another object of this invention is to provide a means for efficiently carrying out the above set forth method or methods of cleaning fruit.

Other objects and advantages of this solution, it is believed, will be apparent from the following detailed description of a preferred embodiment thereof, as illustrated in the accompanying drawing.

In the drawing:

Figure 1 is a top plan view of a chemical washer embodying this invention.

Figure 2 is a sectional side elevation thereof.

In accordance with the method embodying this invention, the fruit to be cleansed is fed from any suitable or desirable means, such as a sorting belt 1, into a solution tank 2, over a table 3, submerged below the surface of the solution within the tank 2. The fruit is propelled over the surface of the table 3 by means of jets 4 of the chemical solution, which are jetted against the fruit in the direction of travel of the same. The fruit, being moved to the end of the table 3, is picked up by means of a star-wheel 5 and transferred to a conveyor 6. Mounted above one portion of the conveyor 6 is a rinsing water spray mechanism 7, by means of which rinsing water is jetted over the fruit as the same travels along with the conveyor 6. The fruit proceeding along the conveyor 6 is dried by means of air jetted from a plurality of jets 8 positioned above the conveyor 6 so as to jet air against the fruit in a direction opposed to the travel of the same along the conveyor 6.

The solution tank 2 should be formed of a material, such for example as wood or the like, which will resist the corrosive action of the chemical solution contained therein.

The chemical solution employed in the tank 2 may be any chemical solution that will react with or have a chemical affinity for the spray residue which is carried by the fruit, this, for example in in the case of fruit carrying a residue of lead arsenate, is found to be a dilute solution of hydrochloric acid. The solution within the tank 2 is circulated through the jets 4 by means of a pump 9 which takes the solution through a strainer 10 from a point near the bottom of the tank 2 and pumps the same through the pipe 11 to which the jets 4 are connected.

In the treating of fruit, such for example as pears, the specific gravity is greater than the specific gravity or density of the solution within the tank 2. I have found that, in order to obtain an effective treatment of the fruit, it is essential that the same be maintained within the region of activity of the sprays 4, so that the chemical solution is sprayed directly against their peripheries. To maintain the fruit within the region of activity of the sprays 4 and to prevent the same from settling within the tank 2 and becoming immobile, I employ the table 3, which is submerged below the liquid level in the tank 2, and is adjustably supported in order to facilitate the feeding of the fruit at the entrance end in conformity with the flow of fluid in the tank 2. The action of the sprays 4 creates a current over the table 3, the speed or force of which current increases from the tank entrance end to the star wheel 5, due to the increasing number and effect of the sprays. The table is adjustable in the tank 2 and this adjustment is made preferably at the fruit entrance end. The table 3 likewise operates to prevent the fruit from piling up in the tank 2 to a thickness of greater than one layer of fruit, thereby insuring that all of the fruit will be subjected to the direct action of the spray of the chemical from the jets 4 and the current set up thereby.

I have found that for different sizes of fruit, passing over the table 3 the depth of the solution in the tank 2 should be regulated. The depth of the solution over the table 3 should be maintained so that the buoyancy of the fruit will be such that the surface of the table 3 will offer sufficient resistance to the travel of the fruit to cause the same to roll over the surface of the table, rather than float or wash over the same.

The cleaning solution or liquid within the tank 2 is continuously circulated over the surface of the table 3. The circulation of the liquid is maintained by the sprays 4 spraying the liquid into the tank 2 in the direction of the travel of the fruit through the tank 2. The spraying of the liquid in this manner tends to build up a head of liquid at the end of the tank 2 adjacent the star wheel 5. The liquid then circulates through the tank downwardly at this end of the table 3, back under the table 3, up through the slotted runway 22 at the entrance end of the table 3 and along the surface of the table 3. The fruit is caused to travel along the table 3 by this current of moving liquid which is thus passing over the surface of the submerged table 3. The liquid sprayed through the jets 4 and impinging against the periphery of the fruit aids in moving the fruit along the table 3. The moving of the fruit between the jets 4, however, is actually accomplished by the force of the current of moving liquid over the submerged table 3. The fruit is in contact with the submerged table 3 and is rolled over the surface of the table 3 by the current of the liquid as it travels over said table 3. The fruit is preferably not completely submerged in the liquid in the tank 2, but the table is adjusted by means of the adjustments 13 so that the correct degree of submergence of the fruit is had. A small portion of the upper periphery of the fruit is preferably left unsubmerged.

The moving liquid, or solution, has another important function other than causing the fruit to roll over the table 3 which is incidental to the moving of the fruit by means of the current of liquid. This function is that the current of liquid in contacting the fruit to move and roll the same has of itself a greatly increased cleansing effect due to the fact that it contacts the greater portion of the periphery of the fruit with sufficient force to move and roll the fruit.

The star wheel 5 has an important function other than the removing of the washed fruit from the tank 2, this being that it forms with its guide rails 15 an obstruction in the path of the fruit against which the same lodge. The fruit is thus held in the liquid in the tank 2 a sufficient length of time, as is determined by the rate of rotation of the star wheel 5, to thoroughly clean the fruit. Without this obstruction the fruit would wash freely over the table 3 and thus escape too freely and quickly to permit the efficient washing of the fruit.

The table 3 presents practically a plane surface and slats 12 may be provided over the same to guide the fruit during its travel thereover. Any suitable or desirable form of means may be provided for adjusting the end of the table 3 vertically in the tank 2, one form of which means is diagrammatically illustrated at 13.

The star-wheel 5 is driven from any suitable or desirable means, such for example as the connection indicated at 20 from the conveyor 6 to the shaft 21 on which the said star wheel is mounted. The star wheel 5 comprises a plurality of paddles by means of which the fruit is lifted from the table 3 and transferred onto the conveyor 6. In order to maintain the fruit in position, curved guide rails or boards 15 are provided intermediate the paddles of the star-wheel 5. Slats 14 are formed integral with the guide rails 15 and are inclined downward to carry the fruit from the star-wheel 5 to the conveyor 6.

Any suitable or desirable means, such as is well understood in the art, may be provided for supplying rinsing water to the jet mechanism 7 for jetting rinsing water against the fruit as the same is delivered to the conveyor 6.

A fan 16, driven from the motor 17 which likewise drives the pump 9, is provided for supplying air to be jetted directly against the fruit on the conveyor 6 through the air jets 8.

The fruit passing over the conveyor 6 is delivered to any suitable or desirable source or may be packed directly as desired.

The fruit is delivered to the tank 2 over an inclined slotted runway 22 to the table 3. Any debris carried with the fruit separates therefrom and falls through said slots into a debris chamber 23 formed at the entrance end of the tank 2 by the partition 24.

In the case a sorting belt 1 is employed, by means of which the fruit is previously segregated as to size, it is preferable that there be provided in the cleaning apparatus above described a partition 18 which divides the solution tank 2, star-wheel 5, and conveyor 6, into separate treating baths, by means of which the previously segregated fruit is maintained separated.

For the cleaning pears of arsenate of lead I have found that a solution of from ½% to 2% hydrochloric acid is most advantageously employed, although other acid and other concentrations of acids may be employed, depending on spray residue or matter to be cleaned from the fruit. In some cases sodium fluoborate solution may be employed as may any chemical found to have an affinity for the matter to be cleaned from the fruit.

It will be obvious from the foregoing that the fruit is propelled through the solution and over the table 3 by the current set up in the solution by, and also by the action of, the sprays 4. The time in which the fruit is treated will depend upon the speed at which the star-wheel 5 is operated to remove the fruit from the tank 2, as this governs the amount of fruit accumulation on the table 3.

Having fully described my invention, it is to be understood that I do not wish to be limited to the details herein set forth, which may obviously be varied without departing from the scope of my invention as defined by the appended claims.

I claim:

1. A method of washing fruit of specific gravity greater than the washing solution, which includes propelling the fruit through the solution, supporting the fruit partially submerged in the solution, spraying the solution over the fruit, and removing the fruit from the solution.

2. A method of washing fruit having spray residues thereon, which includes partially submerging the fruit in a chemical solution having an affinity for the spray residue, contacting the fruit from below to maintain the fruit in a single horizontal layer in the solution, jetting the solution against the fruit to move the same through the solution and removing the fruit from the solution.

3. A method of washing fruit to remove a spray residue, including the steps of partially submerging the fruit in a chemical solution having an affinity for the spray residue, contacting the fruit from below to maintain the fruit in a single horizontal layer in the solution, propelling the fruit through the solution, removing the fruit from the solution, the propelling of the fruit through the solution agitating the solution to increase the rate of chemical action of the solution and the spray residue.

4. A method of washing pears to remove arsenate of lead spray residue, which includes partially submerging the pears in a chemical solution having an affinity for the spray residue, contacting the fruit from below to maintain the fruit in a single horizontal layer in the solution, spraying the solution over the fruit to propel the same through the solution, removing the fruit from the solution, the spray of the chemical solution against the fruit acting to agitate the solution and increase the chemical action between the solution and the spray residue.

5. In an apparatus of the class described, the combination of a solution tank, a table mounted within the solution tank in submerged position, means for spraying the solution against the fruit on the table to move the same along the table, and means for removing the fruit from the solution tank.

6. In a device of the class described, the combination of a tank, a table submerged within the tank, means for adjusting the degree of submergence of the table in the tank, means for spraying the solution against the fruit on the table, and means for removing the fruit from the tank.

7. In an apparatus of the class described, the combination of a solution tank, containing a solution having a chemical affinity for the spray residue to be cleaned from the fruit, a table submerged in the solution tank, and means for spraying the solution against the fruit on the table to move the same through the solution.

8. A method of washing fruit, including the steps of partially submerging the fruit in a liquid, holding the fruit partially submerged against all tendency to submerge the same, and spraying liquid against said fruit in the direction of travel of said fruit to set up a current of moving liquid to move and roll said fruit through the liquid.

9. A method of washing fruit of specific gravity greater than the washing solution which includes partially submerging the fruit in the solution supporting the fruit from total submergence in the solution spraying liquid against said fruit and circulating said solution with sufficient force to move and roll the fruit through said solution.

10. In an apparatus of the class described the combination of a liquid tank, a table submerged in the liquid tank, means for adjusting the submergence of said table and means for circulating said liquid over the surface of said table with sufficient force to move and roll the fruit over the surface of the table.

11. In an apparatus of the class described, the combination of a liquid tank, a table submerged in the liquid tank, means for adjusting the degree of submergence of said table, and means for spraying the liquid against the fruit on the table to move the fruit through the liquid.

12. In an apparatus of the class described, a combination of a liquid tank containing a liquid for cleaning fruit, a table submerged in the liquid tank, means for adjusting the submergence of the table in said liquid and means for circulating the liquid over the surface of the tank to roll and move the fruit along said table surface.

13. A method of washing pears to remove arsenic of lead residue, including the steps of partially submerging the pears in a chemical solution having affinity for the arsenic of lead residue on a support, moving the chemical solution to propel the pears over the support, removing the pears from the chemical solution and rinsing the acid solution from the pears.

14. A method of washing fruit, including the steps of partially submerging the fruit in a liquid, holding the fruit partially submerged against all tendency to submerge the same, circulating the liquid with sufficient force to move and roll the fruit through said liquid, and removing the fruit from the liquid after a predetermined period of time.

15. In an apparatus of the class described the combination of a chemical solution tank, a table submerged within the solution tank, means for jetting the chemical solution against the fruit on the table at an angle to the travel of the fruit along the table, means for removing the fruit from the tank, delivery means associated with the removing means and means associated with the last said means for washing the chemical solution from the fruit.

16. The method of washing fruit, which includes partially submerging the fruit in a solution, spraying at an angle a solution against the fruit to rotate the said fruit, frictionally contacting the fruit in the solution below the axis of rotation of the fruit so that the rolling of the fruit by the solution causes the fruit to travel through the solution in the direction of the spray.

17. A method of washing fruit having spray or other residues thereon, which consists of feeding fruit into a chemical solution having an affinity for the residue, propelling the fruit partially submerged along a supporting surface through the solution, jetting the solution against the fruit to increase the rate of the chemical action of the solution on the spray residue.

18. A method of washing fruit for removal of spray or other residue which consists of feeding fruit into a chemical solution having an affinity for the residue, propelling the fruit through the solution in a path of variable submergence, retaining the fruit in the path of propulsion, and removing the fruit from the solution.

19. A method of washing for the removal of spray residue which consists of feeding fruit into a chemical solution having an affinity for the residue, propelling the fruit partially submerged through the solution, contacting the fruit from below to maintain the partially submerged fruit in a single horizontal layer, retaining the fruit in the path of propulsion, obstructing the fruit in its path of propulsion for a predetermined period of time at the terminus of its travel through the solution to afford time for more effective action of chemical solution on the spray residue, and removing the fruit from the solution.

20. In a device of the class described, the combination of a tank, means within the tank for supporting the fruit which is adjustable for controlling the degree of submergence of the fruit within the tank, means for feeding fruit into the tank, means for terminating the travel of the fruit in its passage through the solution in the tank, and means for removing the fruit from the tank.

21. In a device of the class described, the combination of a tank, means for introducing fruit into the tank, means within the tank for supporting the fruit which is adjustable for varying the degree of submergence of fruit within the tank, means for propelling the fruit through the solution in the tank, means for terminating the progress of the fruit through the solution in the tank, and means for removing the fruit from the tank.

22. In an apparatus of the class described, the combination of a chemical solution tank, a table submerged within the solution tank, means for introducing fruit into the tank and on said table, means for jetting the chemical solution against the fruit on the table, and means for effecting a relative adjustment of the table and the means for jetting the chemical solution to vary the angle of impact of the solution against the fruit, and means for removing the fruit from the tank.

23. A method of washing fruit, which includes propelling the fruit through a chemical solution, positively supporting the fruit in partially submerged position in the chemical solution against all tendencies to totally submerge the same during the propulsion of the same through the solution, spraying the chemical solution over the fruit, removing the fruit from the solution, and removing the chemical solution from the fruit.

24. A method of washing fruit including the steps of partially submerging the fruit in a liquid, contacting the fruit from below to maintain the partially submerged fruit in a single horizontal layer, and circulating said liquid in the direction of travel of said fruit along the support to move and roll the fruit through the liquid.

25. In a fruit washing device of the class described, the combination of a solution tank, a submerged variably adjustable fruit supporting surface within the tank for frictionally contacting the fruit in the solution below the axis of rotation of the fruit in its path of travel through the solution, means for moving the fruit along the supporting surface, and means for removing the fruit from the tank.

26. In a device of the class described, the combination of a tank, means for introducing fruit into the tank, means within the tank for supporting the fruit which is adjustable for varying the degree of submergence of the fruit in the tank, means for propelling the fruit through the solution, and means for removing the fruit from the tank.

27. A process of washing fruit which includes the step of supporting the fruit in a partially submerged condition in a body of liquid washing solution, traversing the fruit therethrough, and tumbling it over and over during such traversing.

28. A method of washing fruit having spray or other residues thereon, which consists of feeding fruit into a chemical solution having an affinity for the residue, propelling the fruit partially submerged along a supporting surface through the solution, directing the solution against the fruit to increase the rate of the chemical action of the solution on the spray residue.

29. In an apparatus of the class described, a washing compartment, a rinsing compartment, said washing compartment having an auxiliary floor serving to substantially divide the compartment into an upper fruit supporting chamber and a lower solution containing chamber, said floor being mounted so as to be inclined upwardly toward the rinsing compartment, a discharge means including a chute for discharging the articles from the upper end of the table to the rinsing compartment, an article inlet chute, a washing solution in said solution compartment, means for transferring washing solution from said lower chamber to said upper chamber, said means including a manifold having laterally extending apertured conduits overlying said upper chamber, means for returning the used solution from the upper chamber to the lower chamber, said floor supporting the articles to be washed in a submerged condition and the solution circulating means directed to wash and propel the articles from the washing compartment toward the rinsing compartment.

30. A method of washing fruit, including the steps of depositing the fruit in a chemical solution, propelling the fruit through the solution by circulation of the solution, positively contacting the fruit from below to maintain it in a single layer in the solution, discharging streams of chemical solution against the fruit to agitate the same as it is carried along in the liquid, and removing the fruit from the solution.

31. A method of washing fruit, including the steps of depositing the fruit in a washing liquid, causing said liquid to flow over a table to advance the fruit in said liquid, maintaining a depth of liquid above said table such as to restrict the fruit to a single horizontal layer in the liquid above said table, and discharging streams of washing liquid downwardly against the fruit to agitate the same as it is carried along in the liquid.

32. A method of washing fruit, including the steps of depositing the fruit in a washing liquid, maintaining a depth of liquid above a table such as to restrict the fruit to a single horizontal layer in the liquid above said table, and discharging streams of washing liquid angularly downward against the fruit to agitate and propel the same through the liquid.

33. In a machine for washing fruit, a washing chamber through which the fruit is passed in a flowing body of washing liquid, means for maintaining the fruit deposited in said liquid in a single layer adjacent the surface of the liquid including a table for preventing fruit in said liquid from piling up more than one layer deep, and means for discharging streams of washing liquid against the fruit to roll and agitate the same as it is advanced in the liquid.

FRED STEBLER.